(12) United States Patent
Frost

(10) Patent No.: US 8,510,725 B2
(45) Date of Patent: Aug. 13, 2013

(54) APPLICATION OF PLATFORM DEPENDENT ROUTINES IN VIRTUAL MACHINES BY EMBEDDING NATIVE CODE IN CLASS FILES

(75) Inventor: Gary Frost, Drift, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 501 days.

(21) Appl. No.: 12/693,810

(22) Filed: Jan. 26, 2010

(65) Prior Publication Data
US 2010/0199268 A1    Aug. 5, 2010

(30) Foreign Application Priority Data
Jan. 30, 2009   (DE) .......... 10 2009 006 882

(51) Int. Cl.
*G06F 9/45*   (2006.01)
(52) U.S. Cl.
USPC ........... 717/139; 717/147; 717/148; 717/163; 717/166
(58) Field of Classification Search
USPC .......... 717/139, 147, 148, 163, 166
See application file for complete search history.

(56) References Cited

U.S. PATENT DOCUMENTS

| | | | |
|---|---|---|---|
| 6,112,025 A * | 8/2000 | Mulchandani et al. | 719/331 |
| 6,282,702 B1 * | 8/2001 | Ungar | 717/148 |
| 6,295,638 B1 | 9/2001 | Brown et al. | 717/1 |
| 6,412,107 B1 * | 6/2002 | Cyran et al. | 717/148 |
| 6,542,887 B1 * | 4/2003 | Abbott | 1/1 |
| 6,557,023 B1 * | 4/2003 | Taivalsaari | 718/1 |
| 6,571,388 B1 | 5/2003 | Venkatraman et al. | 717/166 |
| 6,654,954 B1 * | 11/2003 | Hicks | 717/162 |
| 6,862,683 B1 | 3/2005 | Wille et al. | 713/151 |
| 6,930,695 B1 * | 8/2005 | Pabla | 715/805 |
| 7,191,434 B2 * | 3/2007 | Renouf | 717/148 |
| 7,320,129 B2 * | 1/2008 | Talwar et al. | 718/1 |
| 2004/0172620 A1 | 9/2004 | Perez | 717/118 |

FOREIGN PATENT DOCUMENTS
WO    WO 2006/038103 A1    4/2006

OTHER PUBLICATIONS

PCT Search Report and Written Opinion for PCT/EP2010/000493 dated Apr. 26, 2010.
Translation of Official Communication from German Patent Office for German Patent Application No. 10 2009 006 882.1-53 dated Jan. 19, 2010.

* cited by examiner

*Primary Examiner* — Phillip H Nguyen

(57) ABSTRACT

The deployment of native methods in a virtual machine environment may be significantly simplified by incorporating a corresponding native code segment into the application file, such as a JAVA class file, and using the embedded native code segment for library bind operations of the corresponding class file.

27 Claims, 3 Drawing Sheets

APPLICATION OF PLATFORM DEPENDENT ROUTINES IN VIRTUAL MACHINES BY EMBEDDING NATIVE CODE IN CLASS FILES

BACKGROUND OF THE INVENTION

1. Field of the Invention

The present disclosure generally relates to techniques for operating an electronic device comprising at least a central processing unit on the basis of platform independent software, wherein the platform is provided by a virtual machine that simulates a standard hardware environment.

2. Description of the Related Art

The continuous advance in the field of semiconductor manufacturing resulted in the fabrication of fast and powerful integrated circuits, which may include millions of individual transistor elements. Consequently, highly complex digital circuitry has been developed and used for designing and producing sophisticated central processing units (CPUs), wherein increased packing density in combination with reduced power consumption and high internal storage capacity has fueled a plurality of developments in integrating sophisticated CPUs into a wide variety of electronic devices. Consequently, not only computer systems may have superior performance with respect to operating speed and power consumption, but also a variety of other electronic devices, such as mobile devices in the form of handheld computers, mobile phones and the like, may provide remarkable computational resources. Consequently, with the immense increase of computer systems and other electronic devices, the corresponding demand for sophisticated application has been created and still exists.

Typically, a CPU may be operated on the basis of a dedicated byte code or machine code, which may result in a corresponding change of state of hardware components, such as registers, I/O (input/output) terminals and the like, in accordance with the sequence of machine code instructions. Thus, at the deepest level of a communication between a user application and the hardware system including the CPU, the corresponding sequence of byte code instructions has to be executed by the CPU, thereby providing the desired results in the form of register contents and the like. However, the development of a corresponding more or less complex sequence of machine code instructions may be extremely time consuming and may also require specific skills in "translating" a corresponding problem or object to be solved by a specified application into a sequence of machine code instructions. Moreover, development of a machine code program appropriate for meeting the requirements of a specified application depend strongly on the configuration of the hardware system used, i.e., the specific CPU in combination with other components, such as external working memory, bus configurations and the like, so that a machine code program provided for a specific hardware configuration may not work with a different hardware system. For these reasons, programming languages have been developed to facilitate the communication between the program developer and the hardware system in which the corresponding application has to be executed. For example, the introduction of assembler languages presented a significant advance to provide and set a higher level of abstraction compared to the basic machine byte code. In further attempts for increasing the level of abstraction, higher programming languages have been developed to provide an appropriate platform for generating source code corresponding to a specific application, which may be translated into a corresponding machine byte code that is understandable and thus executable by the microprocessor of the computer system. In these high level programming languages, certain key words have to be used according to a language specific "grammar," thereby allowing defining a sequence of program steps to obtain the required results.

According to one approach in developing high level programming languages, so-called object oriented programming has become a frequently used technique, in which it is attempted to map everyday life situations more conveniently into a computer program. That is, according to the object oriented approach, specific objects or classes may be defined so as to have basic features which may respond to certain events in a predefined manner. In this way, very complex applications may be created, wherein respective objects may repeatedly be used in different applications in a very convenient manner, thereby avoiding the repeated development of the same software.

Although high level programming languages may provide a convenient platform for developing a plurality of applications, the wide variety of available hardware platforms, i.e., different microprocessor types, computer system architectures and the like, may nevertheless require a specific adaptation of the applications to the target architecture. Due to this situation, languages have been developed in view of providing the possibility of developing platform independent applications, in which the software developer may focus on the application itself without having to take into consideration hardware specific characteristics of corresponding computer systems. The demand for platform independent applications may further be driven by the fact that a variety of computer based electronic devices are nowadays available which provide computational resources that may allow the deployment of a plurality of applications. Since electronic devices such as mobile phones, handheld computers and the like may differ significantly from each other in their hardware configuration, a platform independent application would therefore allow the development of applications which may finally be used in any type of electronic device, irrespective of the specific hardware architecture.

Moreover, a steadily increasing amount of computer systems may be connectable by any appropriate network, such as the internet, based on wireless and cable based network channels so that applications may be conveyed to a user via the network, wherein the hardware configuration of a specific target system may not be known in advance.

The concept of providing platform independent applications is actually based on the introduction of a "virtual" computer system or virtual machine which may be operated on a specific virtual byte code that is provided by the platform independent application. Thus, the virtual machine actually simulates a hardware configuration and thus acts as an interface between the platform independent application and the specific hardware configuration. Thus, a plurality of virtual machines may be available that provide the standard platform for executing "platform independent" applications while interfacing with dedicated hardware configurations in combination with associated operating systems. Consequently, when an appropriate virtual machine is installed in a computer system, or any other electronic device, an application may be developed and may be executed by the virtual machine independent of the hardware configuration. For example, the programming language JAVA of Sun Microsystems represents an object oriented language in which applications may be efficiently programmed without requiring an adaptation to different operating systems of the specific computer platforms. If a user starts a JAVA program, the JAVA virtual machine is automatically started and loads corresponding class files, which may then be interpreted to generate the "machine code" of the virtual machine. If further classes may be required for performing the application under consideration, these classes may be loaded on demand during run time and may also be interpreted as required. For example, many classes are available for the virtual machine and may be implemented in a corresponding library. Thus, during operation of the virtual machine, the actual CPU executes the machine code corresponding to the virtual machine thereby requiring memory for storing the state of the processor, for instance in the form of IRQ (interrupt request) addresses and the like. Hence, the processor, the machine code and the state memory define the virtual machine. On the other hand, the virtual machine executes the application corresponding to the compiled program of the application thereby also requiring a dedicated state memory in which any specific information of the virtual machine may be stored. For example, a table of each version of classes that simultaneously exists in the virtual machine may be stored. The virtual machine, the program loaded therein and the respective virtual specific state memory thus realize the actual application. For example, in the JAVA virtual machine specifications, the format of any input is specified, i.e., the class files, and it is also specified how to interpret the class files. However, as previously explained, it is not explicitly specified how to implement the interpretation. Consequently, an independently operating platform system is provided so that it is not relevant for the JAVA application whether it is executed on a LINUX system, a Windows system or any other type of operating system, as long as a dedicated virtual machine is installed for any of these platforms.

The desired platform independent functionality of JAVA applications is realized in the following manner. The input for the JAVA virtual machine or class files may contain any information about the desired application. The class files have a specific structure which is realized by a plurality of sections which contain required information, such as constant pool entries, method and field descriptions, code and debug information and the like. Consequently, upon loading and interpreting a corresponding class file, the information contained in these standard sections may be used for verifying and preparing the class file for being executed by the virtual machine.

Basically, a class may be understood as representation of a plurality of similar objects which may have attributes and methods. An attribute may be considered as a constant or a variable having a specific type. A method may be understood as a "function" which may thus represent a sequence of process steps represented by a table of byte codes, i.e., machine instructions of the virtual machine that have to be executed in order to define a specified program sequence. The byte code of the virtual machine may represent a similar level of abstraction as an assembler instruction, previously explained. Thus, for each method, corresponding local variables may have to be stored in combination with additional information with respect to the maximum amount of memory space required and the like. In addition, due to the object oriented nature of the language, classes may inherit methods and attributes from other classes, which may also have to be stored in the standard sections of the class under consideration. In addition, security information and information for exception handling and debugging has to be provided within the standard sections. Moreover, the virtual machine comprises a class loader that is responsible for "converting" the class information externally stored in class files into run time structures. For this purpose, the class loader may verify the consistency of the class under consideration, for instance in view of verifying that each part of the file is accessible via the program and the like. When the verification is completed without identifying any errors, the class loader loads the information into the virtual machine and initiates the byte code executor of the virtual machine. The virtual machine executor is responsible for executing methods on the basis of byte codes, as described above. If an instruction for generating a version of a respective class is encountered, the byte code executing unit detects whether or not this class has already been loaded. Consequently, corresponding class files may be loaded into the virtual machine upon request during run time, where corresponding class files may be provided by any appropriate source, such as a local storage of the platform under consideration, a remote computer and the like.

Although the feature of independence of the virtual machine from any specific operating system and hardware configuration is highly advantageous for a plurality of applications, it may nevertheless be advantageous to incorporate platform specific "methods" so as to use specific characteristics of the platform, thereby enhancing performance of a respective application, reducing efforts in terms of time for developing specific applications and the like. In this case, the class file may include a reference to a "native method," which is to be understood as a platform specific set of instructions appropriate for performing a certain sequence of program steps with high efficiency on the basis of platform internal resources. Corresponding native methods may typically be provided in the form of appropriate libraries, such as dynamic link libraries (DLL) used in the operating system Windows, or in so-called shared libraries, for instance used in the operating system LINUX. Upon referencing a corresponding request for a native method, the corresponding library required for servicing the request may have been appropriately "packaged" by the user so that the required libraries are in the application's library path at run time of the application in order to avoid a corresponding run time error when the requested library is not available. Furthermore, frequently, a conflict may occur when different versions of classes require different versions of the native code representing a corresponding native method, which may have to be provided by different native code libraries. In this case, frequently, each version of the class may resolve its request for the native method via the same library path which may thus also result in a corresponding run time error. Consequently, the deployment of a JAVA application requiring the incorporation of native methods may be tedious and error prone, thereby making this approach, i.e., the usage of platform internal resources, less attractive.

In view of the situation described above, the present disclosure relates to systems and methods in which native methods may be efficiently used in an otherwise platform independent application, while avoiding or at least reducing the effects of one or more of the problems identified above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure relates to techniques and systems in which native code may be efficiently used in an application file that has to be executed by a virtual machine.

For this purpose, a mechanism may be applied in which native code may be embedded into the application file, such as a JAVA class file, which may be used as a library when a request for a native method may be detected in the application file. To this end, in some illustrative embodiments disclosed herein, the embedded native code may be appropriately "hidden" within the class file so as to be ignored by the virtual machine when executing the virtual machine specific byte code of the application file. On the other hand, upon preparing the application file for being executed by the virtual machine, the otherwise "hidden" embedded native code, possibly in combination with additional information for managing the embedded native code and the like, may be used as a basis for servicing any request for a native method detected in the actual virtual machine specific instructions. For instance, the embedded native code may be copied to storage available for the virtual machine and may be used for any further library finding operations of the application file under consideration. Consequently, respective high efforts for adding dependencies with respect to native methods to the virtual machine's file path, for instance to the class path of a JAVA virtual machine, and also to augment the application's library path to ensure that the addressed native code library is also available to the virtual machine, may be avoided. Additionally, other alternatives, such as the copying of the native code library under consideration to some directory that is considered as being known to be currently a valid path, may be avoided so that any risk of libraries clashing in this limited name space along the library path may also be avoided. Consequently, a user-friendly mechanism may be provided in which the degree of platform independence, which may be restricted to a certain degree by a necessity of platforms specifically taking care of the availability of a native code library, may be re-established by providing the native code segment or library, possibly in combination with additional information, within a class file and providing the possibility of identifying reference to a native method and using embedded native code for resolving corresponding requests.

One illustrative electronic device disclosed herein comprises a hardware system comprising a central processing unit (CPU), a storage and a bus system connecting the central processing unit and the storage. Furthermore, a virtual machine instruction set implemented in the hardware system is provided and is configured to provide a virtual machine for interpreting application specific instructions into virtual machine specific byte code and executing the virtual machine specific byte code. Furthermore, the electronic device comprises an application file containing a set of application specific instructions to be interpreted into the virtual machine specific byte code, wherein the set of application specific instructions contains a request for a native method. Furthermore, the application file further contains an embedded native code segment that is used for servicing the request upon executing the application file in the virtual machine.

One illustrative method disclosed herein relates to executing instructions in a virtual machine implemented in a hardware system comprising at least a central processing unit. The method comprises providing an application file containing platform independent instructions interpretable into virtual machine specific byte code that is executable by the virtual machine, wherein the application file further contains embedded native code configured to enable execution of native methods in the hardware system. Furthermore, the method comprises searching for a request for a native method in the platform independent instructions and servicing the request on the basis of the embedded native code when the embedded native code comprises an implementation of the native method for the hardware system.

One illustrative storage medium disclosed herein comprises an application file based on computer readable information. The application file comprises a set of platform independent instructions interpretable into byte code that is executable by a virtual machine installed on a hardware system comprising a CPU, wherein the set of platform independent instructions comprises a request for a native method to be executed on the basis of a hardware system specific instruction set. Furthermore, the application file of the storage medium comprises a native code library including at least one implementation of the native method.

One further illustrative storage medium disclosed herein comprises a data file based on computer readable information. The data file comprises a set of platform independent instructions interpretable into byte code that is executable by a virtual machine installed on a hardware system comprising a CPU, wherein the set of platform independent instructions causes the virtual machine to perform the following acts: finding an application file requested by the virtual machine; loading the application file into the virtual machine; and searching for a request for a native method contained in a platform independent instruction set provided in the application file and searching for an embedded native code library in the application file upon finding the request for the native method.

BRIEF DESCRIPTION OF THE DRAWINGS

The disclosure may be understood by reference to the following description taken in conjunction with the accompanying drawings, in which like reference numerals identify like elements, and in which.

Figure 1A:
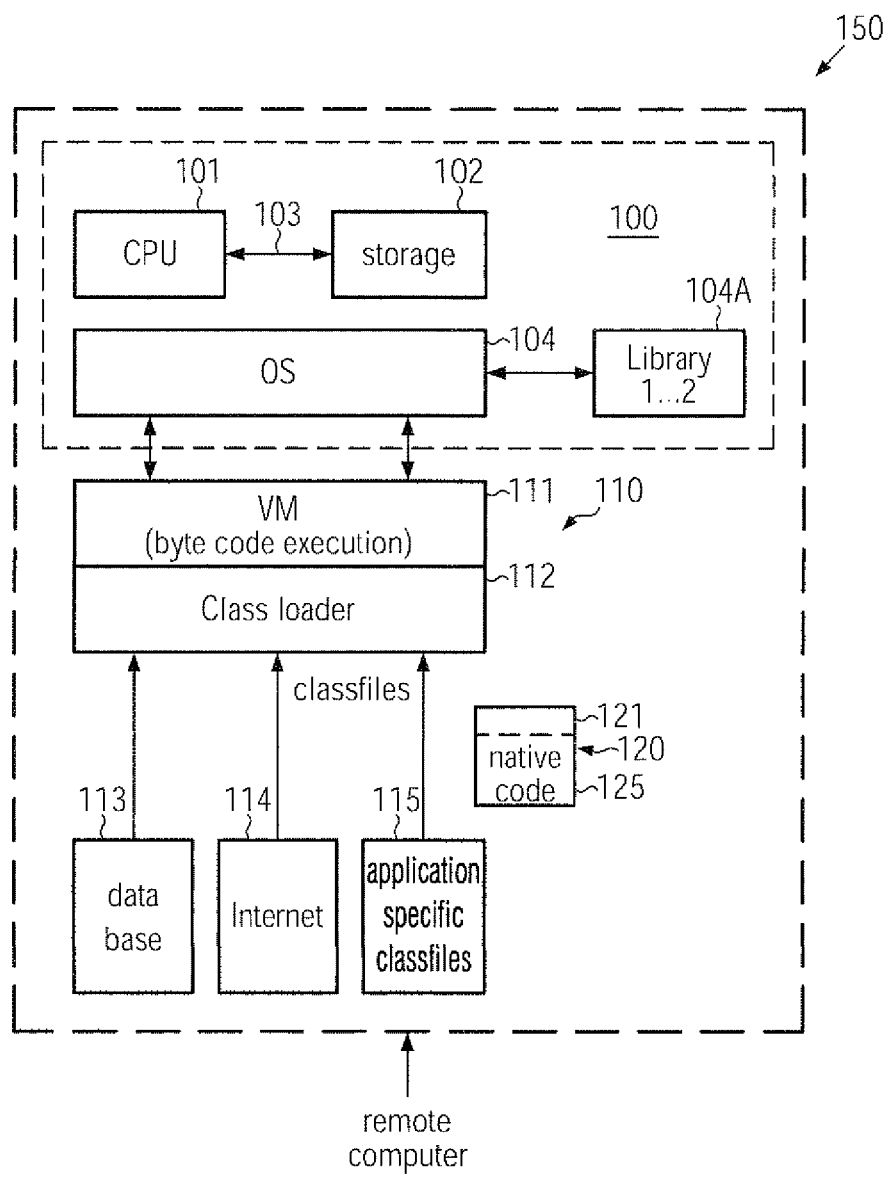
FIG. 1a schematically illustrates a diagram of a hardware configuration which may represent an electronic device, a computer system and the like in which a virtual machine is installed including a mechanism for handling the request for native methods on the basis of native code embedded into an application file, according to illustrative embodiments.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Generally, the present disclosure addresses the problem of handling a request for native methods to be performed in an otherwise platform independent virtual machine by embedding native code or libraries into the application file, which may not be "visible" for the virtual machine during run time, i.e., after interpreting the application file, but may be used during preparing application files for being executed in the virtual machine. For this purpose, the platform independent instructions of the application file may be searched for any reference to a native method, for instance upon verifying consistency and other features of the application file, and, if a corresponding reference is found, searching for embedded native code, which may be readable for the virtual machine prior to the actual run time of the application file under consideration. The embedded native code may be associated with appropriate additional "housekeeping" information to enable an appropriate response with respect to the request for a native method. For example, the embedded code and/or the additional information may be searched for an appropriate implementation of the requested native method and may, if an appropriate implementation is detected, be copied to an appropriate storage place so as to be accessible for the virtual machine during run time of the application file. Hence, for any further library bind operation, the corresponding copy of the native code segment may be used, thereby avoiding user initiated platform specific operations in ensuring availability of a native code library during run time of the application file. In this manner, platform specific features may be incorporated into the platform independent application, thereby extending the resources and thus performance of the platform independent application without requiring specific knowledge of the hardware system under consideration. Thus, the feature of platform independence may be extended to a certain degree by simplifying the incorporation of native methods. It should be appreciated that the systems and mechanisms described herein may be highly advantageous in combination with a JAVA virtual machine since here efficient tools may be available for implementing the mechanism since, for instance, the class file structure for a JAVA virtual machine may allow the incorporation of additional sections, which may be ignored by the virtual machine upon run time, as long as the standard class sections meet the requirements in view of security, consistency and the like. Additionally, in JAVA, a part of the virtual machine responsible for "preparing" the class files for execution by the virtual machine may be readily modified so as to enable access to additional information provided in the class file, which may then be appropriately used for providing native codes or libraries during run time of the class file under consideration. However, the mechanisms described herein may also be applied to other virtual machine implementations by appropriately configuring the respective application files to include required native code segments and handling these native code segments to ensure accessibility during run time of the application file under consideration. Consequently, the present disclosure should not be considered as being restricted to any specific implementation of a virtual machine unless such restrictions are explicitly set forth in the appended claims and/or in embodiments described in the specification.

FIG. 1a schematically illustrates an electronic device 150 which may represent a computer system of any type, such as a mobile computer, for instance in the form of a handheld PDA (personal digital assistant), a laptop and the like, a stationary computer system and the like. In other cases, the electronic device 150 may represent any device, such as a mobile phone, an electronic circuitry including sensor elements and the like, which may comprise appropriate computational resources for establishing a virtual machine. The electronic device 150 may comprise a platform 100, which is to be understood as a hardware configuration providing the resources required for implementing a virtual machine, wherein the hardware configuration may be operated in combination with a dedicated operating system, as may typically be used in computer systems. Thus, the platform 100 may comprise at least a central processing unit 101, such as any type of microprocessor, microcontroller and the like, in which electronic circuitry may provide the required hardware components, such as a CPU core, buffer memories, internal signal buses, supply voltage sources and the like. It should be appreciated that the CPU 101 may not necessarily be provided as a single chip component but may comprise a plurality of individual semiconductor chips so as to obtain the desired functionality, depending on the overall complexity of the platform 100. Similarly, a storage 102 may be provided and may have any appropriate configuration, for instance the storage 102 may comprise non-volatile memories, such as a hard disk, flash memories and the like, and/or volatile memory devices in the form of RAM (random access memory) devices and the like. Furthermore, the CPU 101 and the storage 102 may be connected by a bus system 103 so as to enable data exchange between the CPU 101 and the storage 102. It should be appreciated that any further components, such as voltage sources, I/O components and the like, may be provided in accordance with the configuration of the platform 100, wherein these components are not shown. Furthermore, in the embodiment shown, the platform 100 may comprise an operating system (OS) 104, which may be understood as an appropriate set of instruction executed in the CPU 101 during operation of the device 150, thereby providing an interface between platform specific applications and the CPU 101. That is, the operating system 104 may coordinate the processing of one or more platform specific applications and may also provide a plurality of defined applications, which may be referred to as libraries 104A and which may be available for corresponding platform specific applications in order to enhance the overall performance. It should be appreciated that an application that may be directly supplied to the operating system 104 may be referred to herein as platform specific applications, since this type of application has to be developed by taking into consideration at least specific features of the operating system 104, while also in many cases hardware specific features of the CPU 101, the storage 102 and/or the bus system 103 may have to be taken into consideration.

Furthermore, the electronic device 150 may comprise a virtual machine, which may be understood as a platform dependent application for the platform 100, i.e., the virtual machine 110 may represent a plurality of platform specific instructions which, when executed by the platform 100, may simulate a platform having well-defined standard characteristics with respect to an application executed by the virtual machine 110. Thus, as previously explained, the virtual machine 110 may represent, with respect to the platform 100, a platform specific application that in turn represents a standard operating environment for any application dedicated for the virtual machine 110. In this sense, an application for the virtual machine 110, irrespective of the configuration of the platform 100, may be referred to as a platform independent application. In the embodiment shown, the virtual machine 110 may comprise a byte code execution unit 111 and a loading unit 112, which is indicated as a class loader when the virtual machine represents a JAVA virtual machine (JVM). Furthermore, in the state shown in FIG. 1a, the electronic device 150 may comprise one or more sources of application files, such as a database 113, which may be associated with the application representing the virtual machine 110, applications provided from a remote computer system or any other file supplier, for instance via any appropriate network, such as the internet, as indicated by 114, application specific files 115, which may be locally stored in the platform 100 and the like. At least one of the file sources 113, 114 and 115 may contain an application file 120, which may include a request for native code so as to take advantage of platform specific libraries, such as the libraries 104A. Hence, in conventional virtual machines, a corresponding application file may contribute to a certain degree of platform dependency, since respective methods are required for ensuring availability of corresponding native code resources during run time of the application file in the virtual machine 110. According to the principles disclosed herein, the application file 120, which may also be referred to as a class file when the virtual machine represents a JAVA environment, may contain native code 125 in addition to platform independent instructions that may be processed by the byte code execution unit 111. The native code or library 125 may represent an instruction set appropriate for executing a native method, which may be directly processed by the platform 100 on the basis of an appropriate interface system (not shown), thereby providing enhanced performance of an application or part thereof corresponding to the file 120. For this purpose, the native code 125 may be embedded such that the operation of the unit 111 may not be affected by the presence of the native code 125 so that the corresponding platform independent instructions 121 may be processed without interference. On the other hand, the native code 125 may be efficiently used upon "preparing" the application file 120 by the unit 112 so as to enable access to the native code or a copy thereof during the actual run time of the application file 120.

During operation of the electronic device 150, execution of an application which may contain the application file 120 may be requested, which initiates activation of the virtual machine 110 if not currently in operation. The unit 112, such as a JAVA class loader, may basically service a request for an application file, such as a class file issued by the unit 111. The servicing of a corresponding request for an application file may include the search for a corresponding application file, for instance the various sources 113, 114 and 115 may be searched and may include verification of specific features of class files, such as consistency with language specific format requirements, security aspects and the like. Furthermore, the application file may be resolved, i.e., the file may be completely prepared for execution. Furthermore, the activity of the unit 112 may include operations such as converting the platform independent instruction set contained in the data 121 into a run time format to be used by the unit 111. Additionally, the unit 112 may detect requests for a native method in the platform independent instructions and may, upon detection, search for an appropriate implementation of the native method within the native code segment 125. If an appropriate implementation is identified in the segment 125, preparation of the application file 120 may be continued by ensuring accessibility of the appropriate implementation, for instance by copying at least a portion of the segment 125 into a dedicated memory space and using the corresponding memory space for further library link operations that may be required in the application file 120.

Figure 1B:
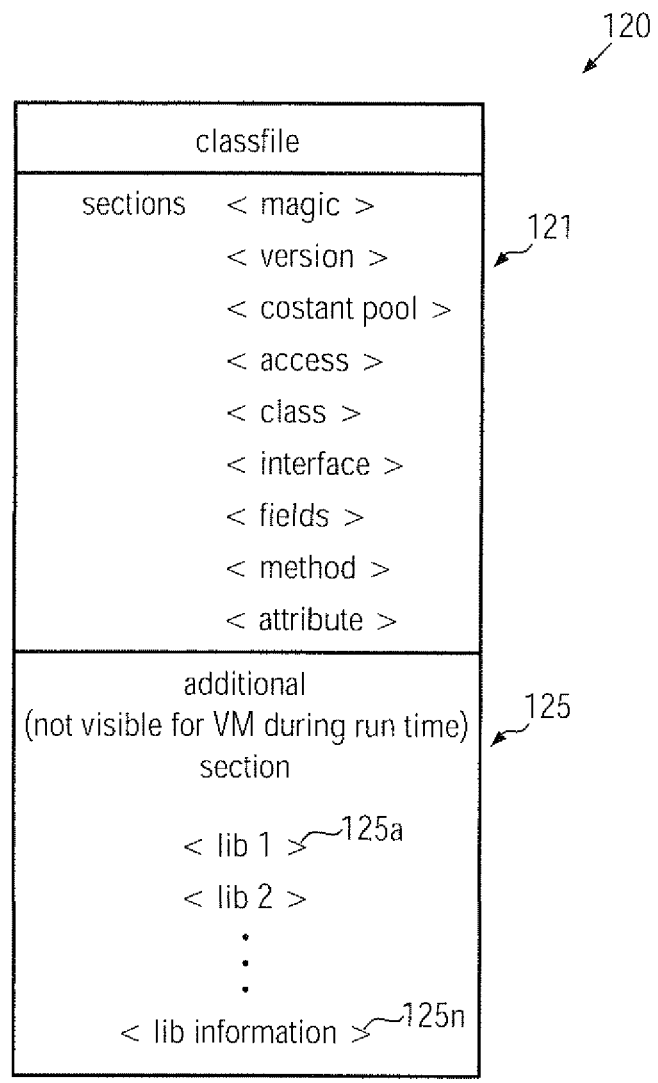
FIG. 1b schematically illustrates an example of a file structure including embedded native code segments, according to illustrative embodiments.

FIG. 1b schematically illustrates a schematic view of the application file 120 according to one illustrative embodiment. As illustrated, the application file 120 may represent a class file for a JAVA environment, wherein the "standard" JAVA information contents 121 may have to be provided in a specific format determined by the JAVA language specifications, which are well known in the art. For example, a plurality of sections, here indicated in a simplified manner as magic number, version, constant pool, access, class, interface, fields, method and attribute, may have to be used so as to be consistent with the JAVA language. Thus, upon loading the application file 120, consistency of the sections of the contents 121 may be verified, while, during this phase, any additional sections, which are indicated as "lib 1," "lib 2" . . . "lib information," may be ignored with respect to consistency with corresponding language specifications. The additional sections, which may also be indicated as sections 125a . . . 125n may be "invisible" during verifying consistency of the sections of the portion 121 by, for instance, providing an appropriate section header that does not interfere with the language specifications indicating the sections 125a . . . 125n as non-standard sections. It should be appreciated that one of the sections 125n may comprise any additional information for appropriately using the native code segments, while in other cases each of the sections 125a . . . 125n may comprise the corresponding "housekeeping" information, for instance for identifying respective native methods for which an implementation is provided and for which corresponding implementations are relevant. Thus, corresponding application files may be provided with a certain degree of platform independence by incorporating a plurality of platform specific features for different types of platform, thereby significantly enhancing performance and user-friendliness of the corresponding applications. In other cases, a certain basic application would be enhanced in performance by incorporating platform specific characteristics, wherein basically the same application may be dedicated to different platforms by incorporating the different platform specific information.

Figure 1C:
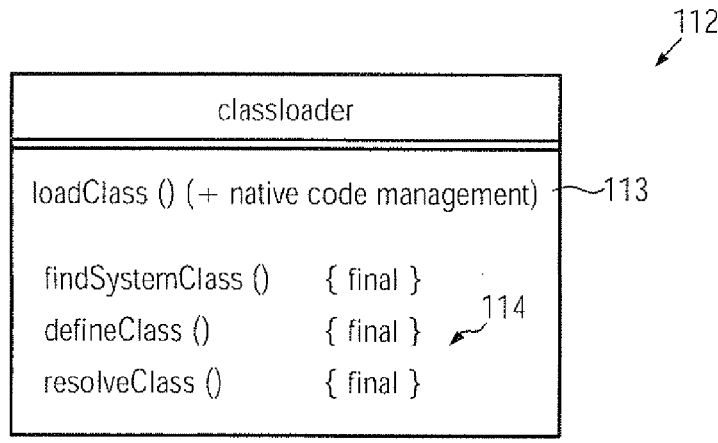
FIG. 1c schematically illustrates a portion of a virtual machine that is appropriately configured for handling embedded native code segments, for instance in the form of a modified class loader in a JAVA environment.

FIG. 1c schematically illustrates a structure of the unit 112, which may itself be implemented in the form of an application executable by the virtual machine 110. For example, as previously explained, JAVA represents an object oriented language in which certain properties of basic or parent classes may be inherited by the child classes, wherein some of these properties, that is, methods, may be overwritten so as to extend various capabilities of the parent class. For example, a standard class loader of the JAVA environment may represent the parent class and a modified class loader may be defined by implementing the capability of handling the native code segment 125 of the application file 120 (FIG. 1*b*) so as to appropriately service the request for native methods. In the embodiment shown in FIG. 1*c*, the loader unit 112 may comprise a plurality of methods which may be inherited by the parent class loader and which may not be changed since these methods may be indicated as "final," as indicated by reference sign 114. On the other hand, the load class method of the parent class loader may be extended so as to include handling of the native code segment, thereby obtaining a corresponding method 113.

Figure 1D:
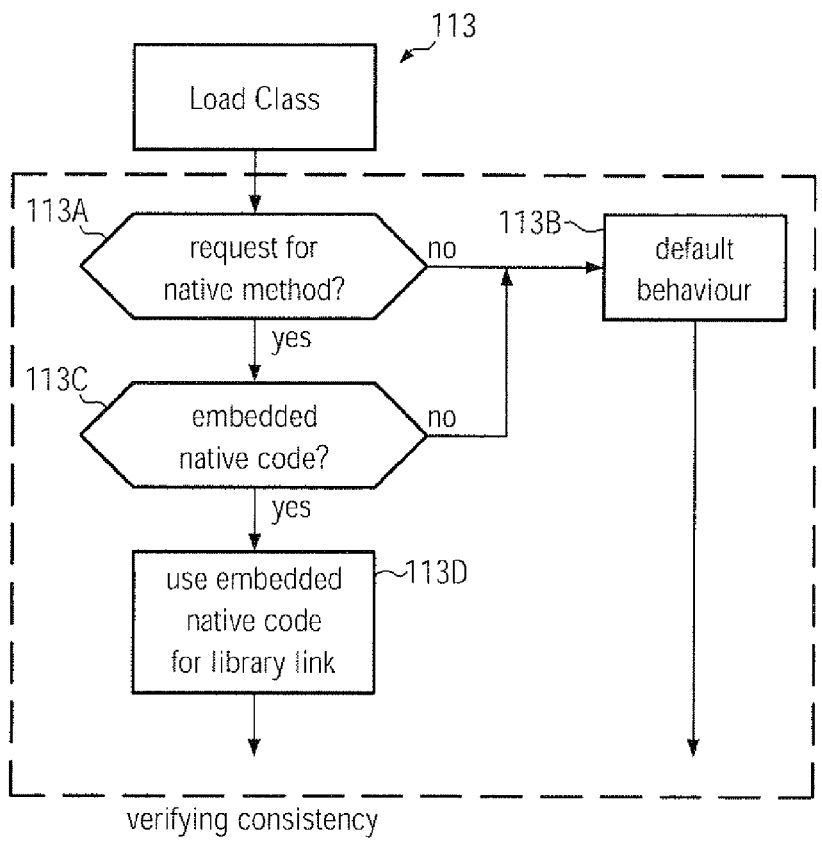
FIG. 1d schematically illustrates a mechanism implemented in the virtual machine for handling requests for native methods, for instance on the basis of the modified class loader of FIG. 1c, according to still further illustrative embodiments.

FIG. 1*d* schematically illustrates an illustrative mechanism for implementing the required functionality of handling native code segments while nevertheless providing the possibility of verifying consistency of the standard information content, such as the portion 121 (FIG. 1*b*). As illustrated, the load class method 113 may comprise a first step 113A in order to identify a request for a native method in the corresponding platform independent instruction set 121 of the class file 120, as shown in FIG. 1*b*. If a corresponding request for a native method may not be detected in step 113A, the load class method may continue with a default behavior, as indicated by step 113B. In this case, verification of consistency and the like may be performed in the usual manner. When a request for a native method is detected in step 113A, the mechanism may continue to step 113C, in which it is searched for any embedded native code in the application file. For this purpose, the load class method may be appropriately configured so as to identify respective additional sections or any other information provided in the additional sections 125*a* . . . 125*n* (FIG. 1*b*) so that the presence of the embedded native code may be detected and further information with respect to the request for a native method may also be assessed. For example, based on the additional information that may be contained in the sections 125*a* . . . 125*n* of FIG. 1*b*, it may be assessed whether or not an appropriate implementation for the requested native method is available. If the corresponding embedded native code is not detected or an appropriate implementation is not available within the embedded native code, the mechanism may advance to step 113B and apply a default behavior. In the other case, if an appropriate implementation is identified that matches the current platform architecture, the associated native code segment, or a portion thereof, such as a specific DLL or shared library, may be copied to a dedicated memory space 113D and may be used for further library find operations of the class file under consideration. Thereafter, further required methods may be performed by the class loader 112, in which the class file under consideration may then be prepared for being executed by the unit 111 (FIG. 1*a*), for instance by applying the methods 114 of FIG. 1*c*. Thus, during the remaining processing of the class loader 112, the embedded native code segment 125 (FIG. 1*b*) may remain invisible and may thus not interfere with the execution of the instructions in the portion 121 (FIG. 1*d*).

As a result, the present disclosure provides electronic devices that may be operated on the basis of a virtual machine and application files having an embedded native code segment for providing the possibility of efficiently using platform specific features without requiring user interaction. The specific application files may be provided by any source, such as by a remote computer system, via any appropriate network, or by any other appropriate storage medium that may be accessed by the target platform. Furthermore, the virtual machine may have implemented therein an appropriate mechanism for detecting a request for native methods, in which case the respective application file may be searched for embedded native code segments, which may then be used for any library incorporations required by the application file. For example, a modified class loader may be provided, for instance on the basis of any computer readable storage medium, and may be incorporated into the virtual machine mechanism to provide the extended functionality. Consequently, the deployment of JAVA applications, which may require native methods, may be significantly simplified. Moreover, enhanced versions of native methods for specific platforms, possibly in combination with more generic implementations, may be packaged in a highly efficient manner, which may then be efficiently "resolved" by the virtual machine, for instance the class loader, for instance by any appropriate technique, such as pattern matching mechanisms and the like, so as to select an optimum implementation during run time. Furthermore, multiple versions of one or more classes may be loaded into the virtual machine at the same time, even if different native methods may be requested by the various versions, since a conflict of libraries may be efficiently avoided by the mechanisms described above.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An electronic device comprising a hardware system, said electronic device comprising:
 a virtual machine implemented in said hardware system, wherein said virtual machine is configured to interpret an application file comprising a platform-independent portion that is independent of said hardware system and a native portion that is functionally dependent upon the hardware system,
 wherein the virtual machine is configurable to search the application file for the native portion in response to detecting a request for a native method in the platform-independent portion and to copy the native portion to storage to be accessible by the virtual machine for subsequent servicing of said request if the native portion corresponds to the requested native method, said native portion being invisible to the virtual machine at runtime.

2. The electronic device of claim 1, wherein said platform-independent portion comprises a plurality of platform independent data and instruction sections, and wherein the application file comprises at least one dedicated section including said native portion.

3. The electronic device of claim 2, wherein said virtual machine is further configured to ignore said at least one dedicated section when not being referenced by one or more of said plurality of platform independent data and instruction sections.

4. The electronic device of claim 3, wherein said virtual machine comprises a file loader configured to provide virtual machine specific byte code corresponding to application specific instructions of said application file.

5. The electronic device of claim 4, wherein said file loader is further configured to identify a reference to the native method in said plurality of platform independent data and instruction sections and to search for the native portion comprising a library required for servicing said native method in said at least one dedicated section of said application file.

6. The electronic device of claim 5, wherein said native portion comprises a plurality of libraries having different platform-specific features, and wherein said file loader is further configured to select said library from the plurality of libraries when said library corresponds to a platform implemented by said hardware systems, store said library on said storage, and to use said stored library for servicing said native method.

7. The electronic device of claim 6, wherein said file loader is further configured to search for another library in said storage when said native portion in said at least one dedicated section does not comprise said library.

8. The electronic device of claim 6, wherein said file loader is further configured to reference said library for servicing a second native method comprised in a second application file.

9. The electronic device of claim 8, wherein said application file and said second application file are objects of a common file class.

10. The electronic device of claim 1, wherein said virtual machine is a JAVA virtual machine.

11. A method of executing instructions in a virtual machine implemented in a hardware system comprising at least a central processing unit, the method comprising:
provproviding an application file containing platform independent instructions interpretable into virtual machine specific byte code executable by said virtual machine, said application file further containing embedded native code configured to enable execution of native methods in said hardware system, said embedded native code being invisible to the virtual machine at runtime;
searching for a request for a native method in said platform independent instructions;
copying, in response to detecting the request, the embedded native code segment to a storage of said hardware system to be accessible by said virtual machine for subsequent servicing of said request; and
servicing said request on the basis of said embedded native code when said embedded native code comprises an implementation of said native method for said hardware system.

12. The method of claim 11, further comprising servicing said request by searching for an external native code library when said embedded native code lacks said implementation of said native method.

13. The method of claim 11, wherein servicing said request comprises storing at least a portion of said embedded native code corresponding to said native method in the storage of said hardware system and using said stored portion of said embedded native code as an external native code library for executing any further library bind operation for said application file.

14. The method of claim 11, wherein providing said application file comprises incorporating said platform independent instructions into a plurality of standard file sections, incorporating said native code into at least one additional file section and marking said at least one additional file section so as to be ignored upon interpreting said platform independent instructions.

15. The method of claim 14, further comprising loading said application file into said virtual machine, verifying said application file and preparing said application file for execution by the virtual machine, wherein said at least one additional file section is ignored during said verifying.

16. The method of claim 11, wherein said application file is a first version of a file class and wherein said method further comprises loading a second version of said file class, wherein said second version contains a second request for a second native method that is different from said native method.

17. The method of claim 11, wherein said application file is a JAVA class file.

18. A non-transitory storage medium comprising an application file based on computer readable information, said application file comprising:
a set of platform independent instructions interpretable into byte code that is executable by a virtual machine installed on a hardware system comprising a CPU, said set of platform independent instructions comprising a request for a native method to be executed on the basis of a hardware system specific instruction set, wherein the platform independent instructions are invisible to the virtual machine at runtime; and
a native code library including at least one implementation of said native method, wherein said native code library is configured to be copied to a storage on the hardware system to be accessible by the virtual machine for servicing the request.

19. The storage medium of claim 18, wherein said application file is a JAVA class file.

20. The storage medium of claim 19, wherein said native code library is included into an additional section that is marked to be ignored upon verifying said class file.

21. The storage medium of claim 18, wherein said storage medium is a portion of a remote computer system connectable to said hardware system.

22. A non-transitory storage medium comprising a data file based on computer readable information, said data file comprising:
a set of platform independent instructions interpretable into byte code that is executable by a virtual machine installed on a hardware system comprising a CPU, said set of platform independent instructions causing said virtual machine to perform the following acts:
finding an application file requested by said virtual machine;
loading said application file into said virtual machine;
searching for a request for a native method contained in a platform independent instruction set provided in said application file;
searching for an embedded native code library in said application file upon finding said request for said native method, wherein the embedded native code library is invisible to said virtual machine at runtime; and
copying the embedded native code library to a storage in the hardware system to be accessible to said virtual machine.

23. The storage medium of claim 22, wherein said platform independent instructions cause said virtual machine to further perform: using at least a portion of said embedded native code library for further library bind operations required by said loaded application file.

24. The storage medium of claim 22, wherein said data file represents a JAVA class file.

25. An electronic device, comprising:
a virtual machine configurable to determine whether an application file comprising a platform-independent portion also comprises an embedded native portion, said determination being performed in response to detecting a request for a native method associated with the embedded native portion in the platform independent portion, said embedded native portion being invisible to the virtual machine at runtime and wherein the virtual machine is configurable to copy the embedded native portion into storage in a hardware system to be accessible by the virtual machine for subsequent servicing of a request for the native method.

26. The electronic device of claim 25, wherein the hardware system comprises a central processing unit (CPU), said storage and a bus system connecting said central processing unit and said storage.

27. The electronic device of claim 25, wherein said embedded native portion comprises a plurality of libraries having different platform-specific features, and wherein said file loader is further configured to select at least one library from the plurality of libraries when said at least one library corresponds to a platform implemented by said hardware systems.

* * * * *

UNITED STATES PATENT AND TRADEMARK OFFICE
CERTIFICATE OF CORRECTION

| | |
|---|---|
| PATENT NO. | : 8,510,725 B2 |
| APPLICATION NO. | : 12/693810 |
| DATED | : August 13, 2013 |
| INVENTOR(S) | : Gary Frost |

It is certified that error appears in the above-identified patent and that said Letters Patent is hereby corrected as shown below:

In the Claims

Column 13, lines 9-12, please change "and wherein said file loader is further configured to select said library from the plurality of libraries when said library corresponds to a platform implemented by said hardware systems," to -- and wherein said file loader is further configured to select said library from the plurality of libraries when said library corresponds to a platform implemented by said hardware system, --

Column 13, lines 39-42, please change "copying, in response to detecting the request, the embedded native code segment to a storage of said hardware system to be accessible by said virtual machine for subsequent servicing of said request; and" to -- copying, in response to detecting the request, the embedded native code to a storage of said hardware system to be accessible by said virtual machine for subsequent servicing of said request; and --

Column 15, lines 15-18, please change "and wherein said file loader is further configured to select at least one library from the plurality of libraries when said at least one library corresponds to a platform implemented by said hardware systems." to -- and wherein said virtual machine is further configured to select at least one library from the plurality of libraries when said at least one library corresponds to a platform implemented by said hardware system. --

Signed and Sealed this
First Day of April, 2014

Michelle K. Lee
*Deputy Director of the United States Patent and Trademark Office*